(12) United States Patent
Mathews et al.

(10) Patent No.: US 8,539,534 B2
(45) Date of Patent: Sep. 17, 2013

(54) STATE-BASED RECOVERY SYSTEM

(75) Inventors: Robin Montague Mathews, Westford, MA (US); Samuel O. Akiwumi-Assani, Beacon, NY (US); Michael J. Talbert, Nazareth, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 287 days.

(21) Appl. No.: 12/842,131

(22) Filed: Jul. 23, 2010

(65) Prior Publication Data

US 2012/0023528 A1  Jan. 26, 2012

(51) Int. Cl.
*H04N 7/173* (2011.01)

(52) U.S. Cl.
USPC ............... 725/91; 725/81; 725/107; 725/110; 725/131; 725/132

(58) Field of Classification Search
USPC .............. 725/91, 110, 81, 131, 139, 107, 132
See application file for complete search history.

(56) References Cited

U.S. PATENT DOCUMENTS

| | | | |
|---|---|---|---|
| 7,937,737 B2 * | 5/2011 | Russ et al. ................... 725/107 |
| 2003/0195974 A1 * | 10/2003 | Ronning et al. .............. 709/230 |
| 2004/0103120 A1 * | 5/2004 | Fickle et al. ............... 707/104.1 |
| 2008/0313687 A1 * | 12/2008 | Rajakarunanayake ........ 725/110 |

* cited by examiner

*Primary Examiner* — Jivka Rabovianski

(57) ABSTRACT

A method including receiving a request from another device to provide television content; sending a response that includes the television content; storing state information associated with the television content, wherein the state information includes an identifier of the other device and an identifier of the television content provided; detecting when an error occurs between the device and the other device; and resending a last television content that was successfully received by the other device before the error occurred.

24 Claims, 18 Drawing Sheets

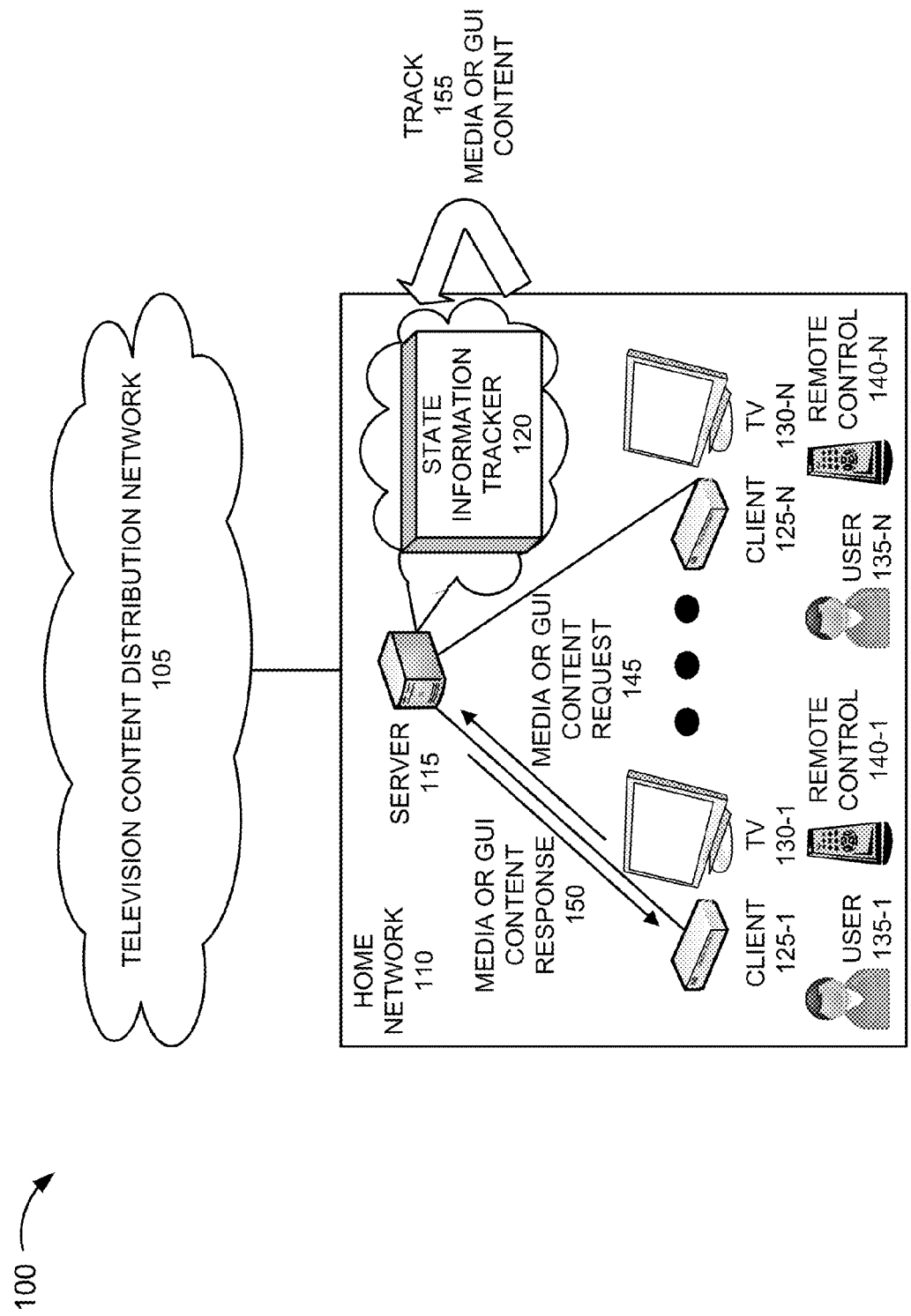

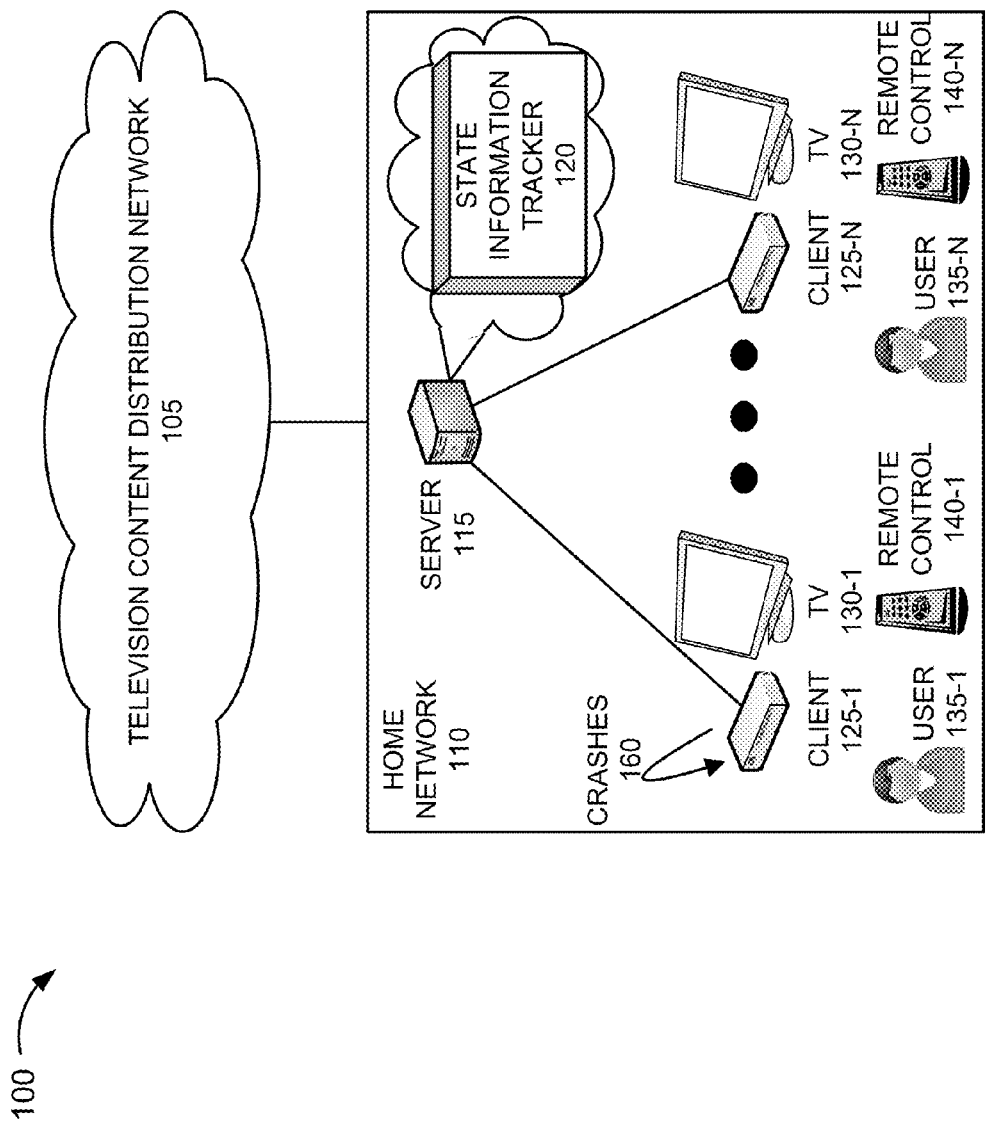

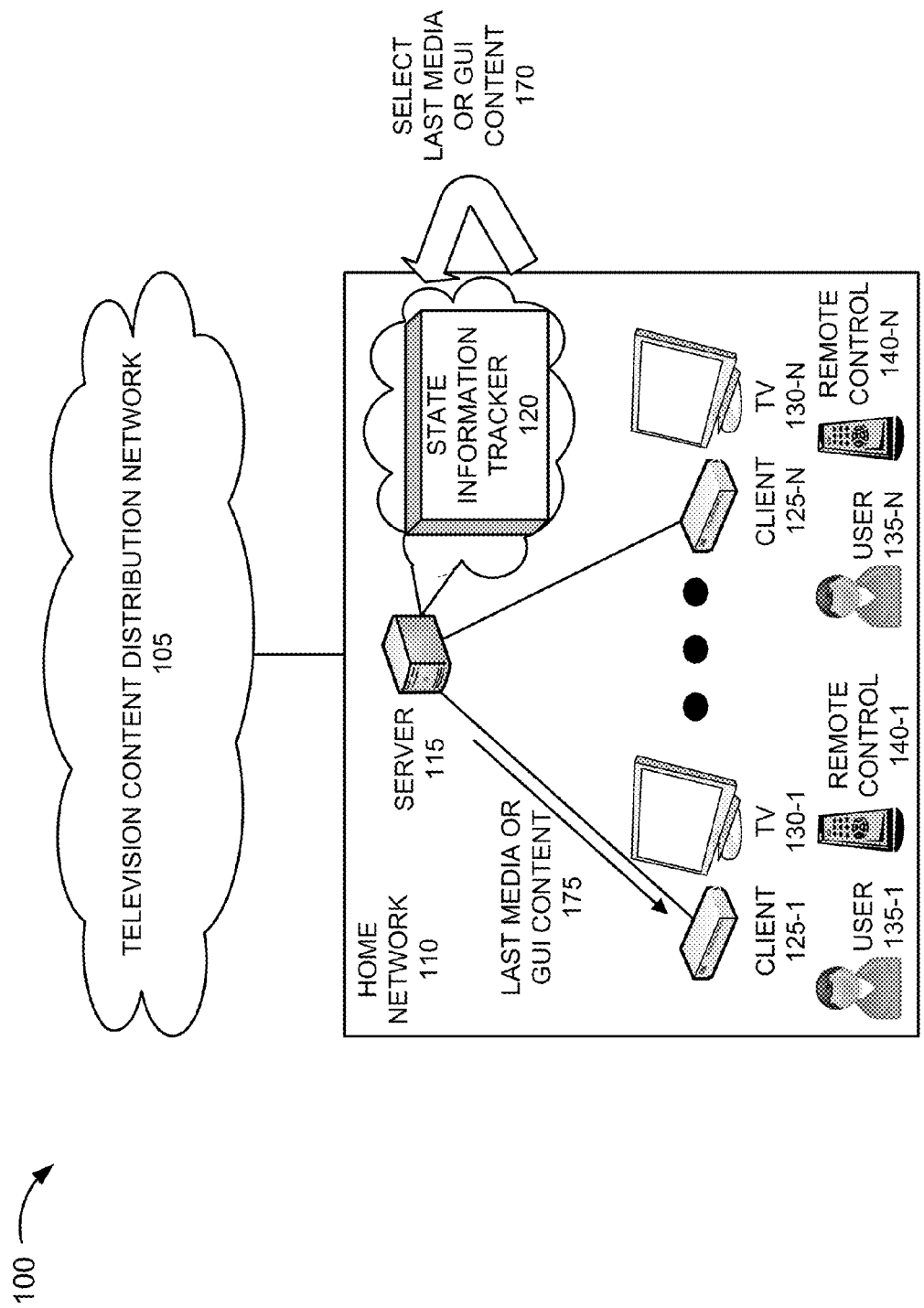

STATE-BASED RECOVERY SYSTEM

BACKGROUND

When an error occurs between a client and a server, a user may experience service interruption and/or delays. For example, when the user navigates, via the client, to various user interfaces or receives other content from the server and a device error occurs or a disconnection between the client and the server occurs, a reset process may be initiated. Thereafter, the client and the server may establish a new connection, and the user may navigate, via the client, from a default user interface or receive default content.

BRIEF DESCRIPTION OF THE DRAWINGS

FIGS. 1B-1E are diagrams illustrating an exemplary process for providing state-based recovery of content according to an exemplary embodiment;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to an exemplary embodiment, a server may store state information associated with content provided to a client. For example, the server may store state information associated with a user's navigation through a graphical user interface (GUI) or media content. In this way, when an error occurs between the server and the client, a reset process may include automatically providing to the client a last user interface to which the user navigated or the last media content the user accessed before the error. This is in contrast to other reset processes that would require the user to navigate to the last user interface from a default user interface or to reselect the media content the user previously accessed.

According to an exemplary implementation, the server may identify a client. For example, the client may have a unique identifier (ID) (e.g., an equipment ID, a network address, etc.). The server may store the unique identifier. As the client requests content (e.g., media content, GUIs, etc.) from the server, the server may provide the requested content and store state information associated with the content provided. For example, the server may store the GUI content (e.g., an identifier of the GUI content) with the unique identifier of the client, or store the media content (e.g., an identifier of the media content) with the unique identifier of the client. According to other implementations, the state information may also include a navigation request associated with the GUI provided or a media content request associated with media content provided.

The server may overwrite the state information as content is requested by the client. In this way, when the client reconnects with the server after the error or recovers from the error, the server may provide the client with the last content received from the server before an error occurs based on the state information. For example, assume that an error occurs between the server and the client, and the reset process is performed. When the client recovers or reconnects to the server, the server may provide the client with the last user interface to which the user navigated or the last media content the user accessed before the error occurred.

Figure 1A:
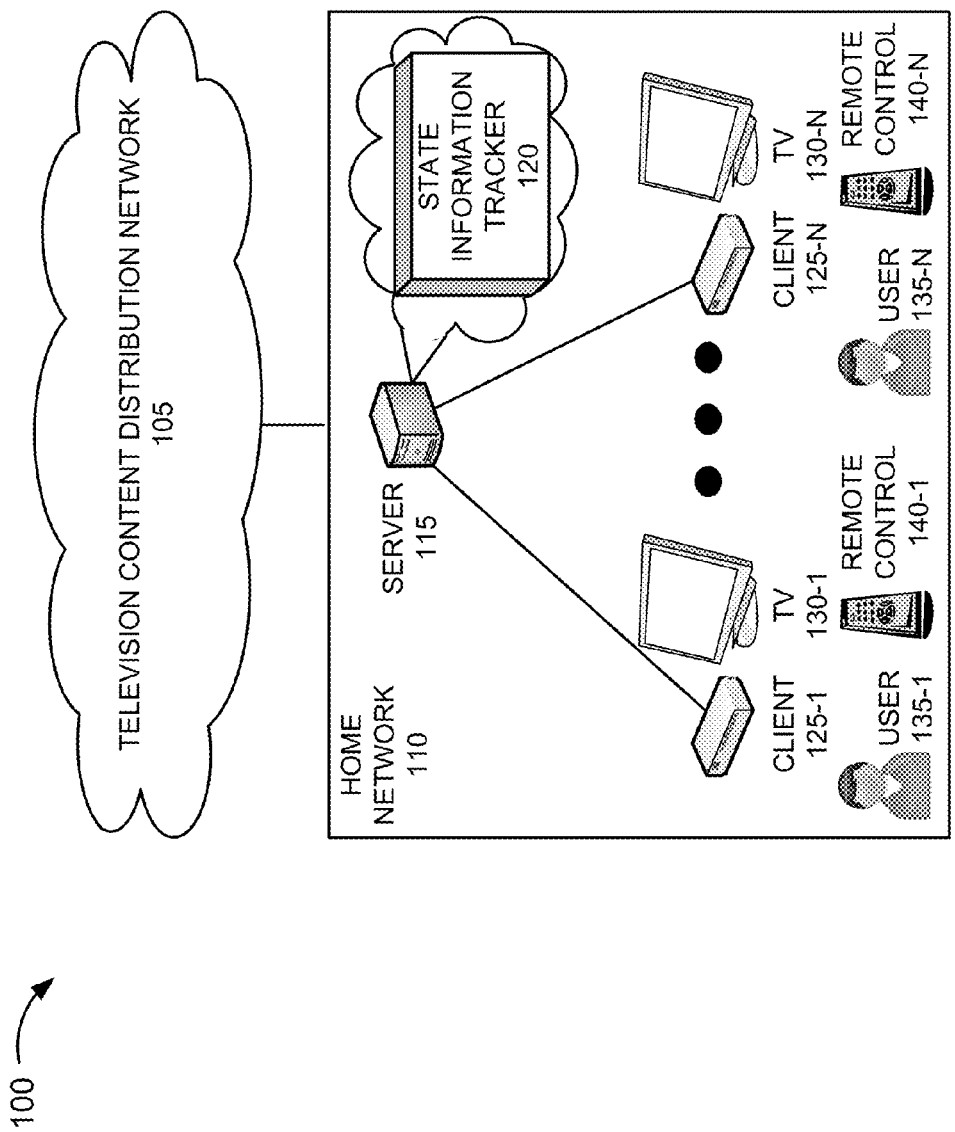
FIG. 1A is a diagram illustrating an exemplary environment in which an exemplary embodiment for providing state-based recovery of content may be implemented.

FIG. 1A is a diagram illustrating an exemplary environment 100 in which an exemplary embodiment for providing state-based recovery of content may be implemented. As illustrated in FIG. 1A, environment 100 may include a television content distribution network (TCDN) 105 and a home network 110 that includes a server 115 including a state information tracker 120, clients 125-1 through 125-N (referred to generally as clients 125 or client 125), televisions (TVs) 130-1 through 130-N (referred to generally as TVs 130 or TV 130), users 135-1 through 135-N (referred to generally as users 135 or user 135), and remote controls 140-1 through 140-N (referred to generally as remote controls 140 or remote control 140).

The number of devices and configuration in environment 100 is exemplary and provided for simplicity. In practice, environment 100 may include more devices, different devices, and/or differently arranged devices, than those illustrated in FIG. 1A. Additionally, or alternatively, according to other implementations, topologies other than client/server may be used, such as, for example, peer-to-peer, etc. In this regard, state-based recovery of content may be performed by devices other than a server (e.g., server 115) and a client (e.g., client 125). Additionally, according to other implementations, some functions described as being performed by a particular device may be performed by a different device or a combination of devices. Environment 100 may include wired and/or wireless connections among the devices illustrated.

TCDN 105 may include a network that distributes television content. For example, although not illustrated, TCDN 105 may include television serving offices, television distribution sites, data centers, etc.

Home network 110 may include a customer site that receives content (e.g., television content) from TCDN 105. As illustrated, home network 110 may include exemplary customer premise equipment, such as, for example, server 115 that includes state information tracker 120, clients 125, TVs 130 and remote control 140.

Server 115 may include a device that provides services and/or other types of assets. For example, server 115 may provide content (e.g., television content) to clients 125. For example, the television content may include GUIs (e.g., television guides, weather information, sports information, games, digital video recording (DVR) information, or the like) and media content (e.g., television programming, movies, video-on-demand, or the like). As described further below, server 115 may include state information tracker 120. State information tracker 120 may track state information associated with content provided to client 125.

Client 125 may include a device that communicates with server 115 to obtain services and/or other types of assets. For example, client 125 may communicate with server 115 to obtain content (e.g., television content). Client 125 may correspond to a thin client. For example, client 125 may not include a hard drive and/or rely on server 115 to perform various processes. According to other implementations, client 125 may not correspond to a thin client. According to yet another implementation, client 125 may correspond to a set top box.

TV 130 may include a device to display content (e.g., television content). According to an exemplary implementation, TV 130 may include client 125. According to other exemplary implementations, TV 130 and client 125 may be separate devices, as illustrated in FIG. 1A. Remote control 140 may include a device that communicates with TV 130 and/or client 125 to allow user 135 to interact with TV 130 and/or client 125. User 135 may be a subscriber of TCDN 105.

Figure 1D:
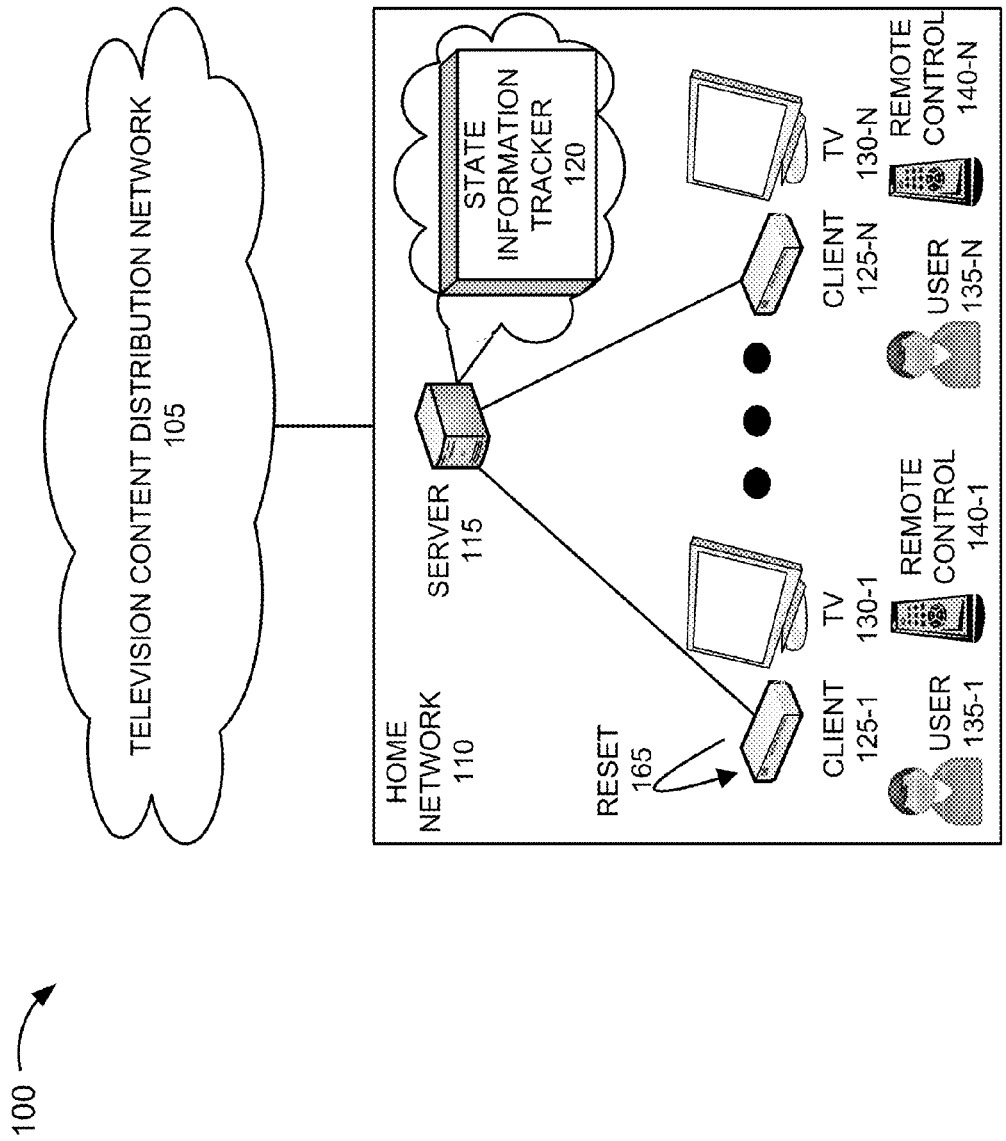

Referring to FIG. 1B, according to an exemplary process, user 135-1 may select a GUI or media content using remote control 140-1 and client 125-1. Client 125-1 may send a media or GUI content request 145 to server 115. Server 115 may send a media or GUI content response 150 to client 125-1. Additionally, state information tracker 120 may track 155 state information associated with the media or GUI content provided to client 125-1. Subsequently, as illustrated in FIG. 1C, client 125-1 crashes 160. User 135-1 may unplug client 125-1 and client 125-1 may reset 165, as illustrated in FIG. 1D.

Referring to FIG. 1E, once a connection is re-established between client 125-1 and server 115, server 115 may select the last media or GUI content 170 provided to client 125-1 before crash 160 occurred based on the stored state information. Server 115 may provide the last media or GUI content 175 to client 125-1.

As a result of the foregoing, a disruption of service to user 135 may be minimized when an error occurs between client 125 and server 115. Since an exemplary embodiment has been broadly described, a more detailed description is provided below, along with various implementations.

Figure 2:
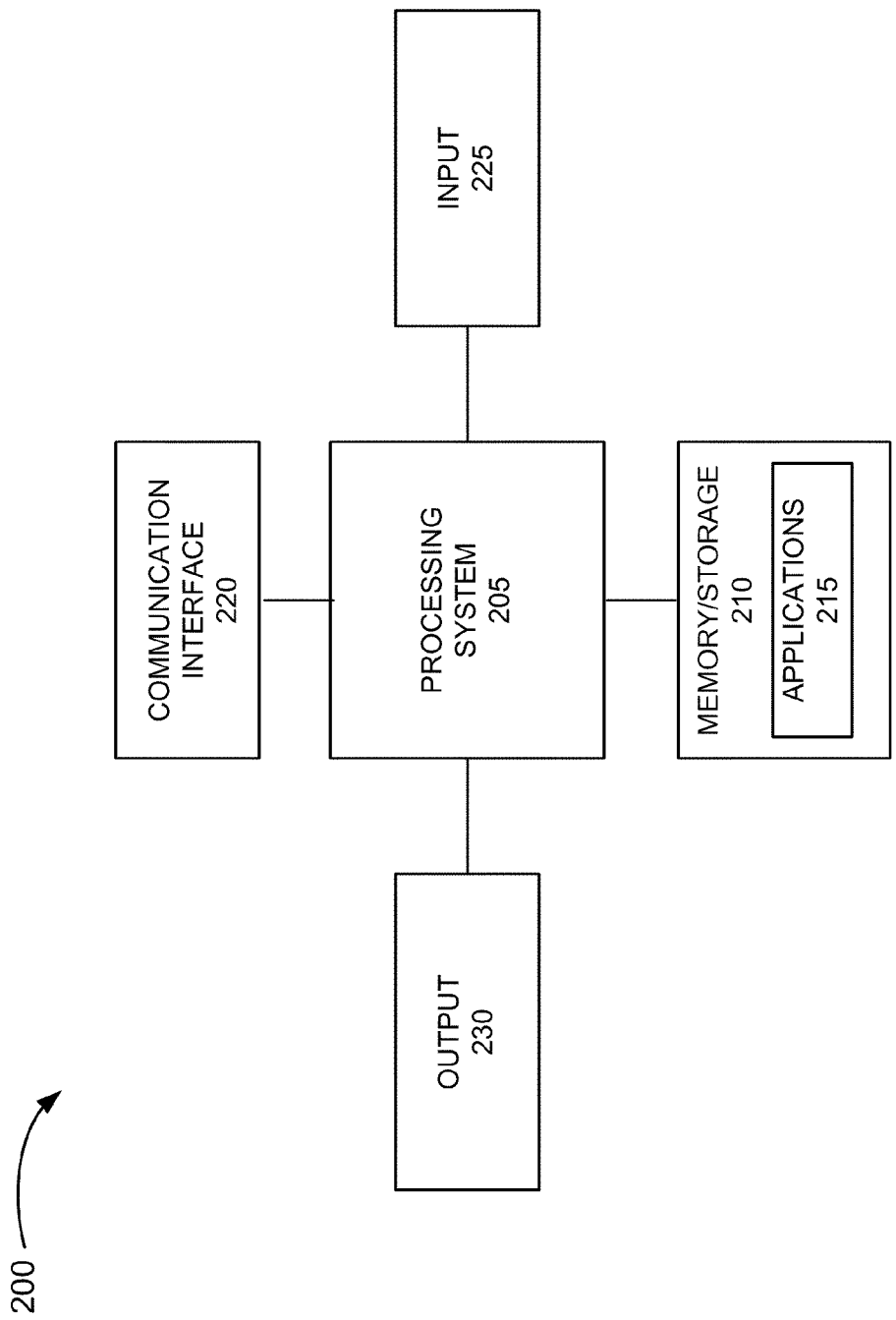
FIG. 2 is a diagram illustrating exemplary components of a device that may correspond to one or more of the devices in the environment depicted in FIGS. 1A-1E.

FIG. 2 is a diagram illustrating exemplary components of a device 200 that may correspond to one or more of the devices in environment 100. For example, device 200 may correspond to server 115. According to some implementations, device 200 may correspond to client 125. As illustrated, device 200 may include a processing system 205, memory/storage 210 including applications 215, a communication interface 220, an input 225, and an output 230. According to other implementations, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or more operations based on an operating system and/or various applications (e.g., applications 215).

Processing system 205 may access instructions from memory/storage 210, from other components of device 200, and/or from a source external to device 200 (e.g., a network or another device).

Memory/storage 210 may comprise one or multiple memories and/or one or multiple secondary storages. For example, memory/storage 210 may comprise a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory and/or a secondary storage that is external to and/or removable from device 200, such as, for example, a Universal Serial Bus (USB) memory, a dongle, a hard disk, mass storage, off-line storage, etc.

The term "computer-readable medium," as used herein, is intended to be broadly interpreted to comprise, for example, a memory, a secondary storage, a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Memory/storage 210 may store data, applications 215, and/or instructions related to the operation of device 200. For example, with reference to server 115, applications 215 may include one or multiple applications for providing a state-based recovery of content, as described further below.

Communication interface 220 may permit device 200 to communicate with other devices, networks, and/or systems, or the like. Communication interface 220 may include a wireless interface and/or a wired interface. Communication interface 220 may include a transmitter, a receiver, and/or a transceiver. Communication interface 220 may operate according to various protocols, standards, and the like.

Input 225 may permit an input into device 200. For example, input 225 may include a keyboard, a mouse, a microphone, a display, a touchpad, a button, a switch, an input port, voice recognition logic, fingerprint recognition logic, a web cam, and/or some other type of visual, auditory, tactile, etc., input component.

Output 230 may permit an output from device 200. For example, output 230 may include a speaker, a display, one or more light emitting diodes (LEDs), an output port, and/or some other type of visual, auditory, tactile, etc., output component.

As described herein, device 200 may perform processes in response to processing system 205 executing software instructions (e.g., applications 215) contained in a computer-readable medium, such as memory/storage 210. By way of example, the software instructions may be read into memory/storage 210 from another computer-readable medium or from another device via communication interface 220. The software instructions stored in memory/storage 210 may cause processing system 205 to perform processes described herein. Alternatively, device 200 may perform processes based on hardware (processing system 205, etc.), hardware and firmware, and/or hardware, software, and firmware.

As previously described, according to an exemplary embodiment, server 115 may track state information associated with content provided to client 125. For example, server 115 may include state information tracker 120. FIGS. 3A-3D are diagrams illustrating an exemplary process associated with state information tracker 120 for providing a state-based recovery of content. State information tracker 120 may be implemented in hardware (e.g., processing system 205, etc.), hardware and software (e.g., applications 215), or hardware, software, and firmware based on the components illustrated and described with respect to FIG. 2.

Figure 3A:
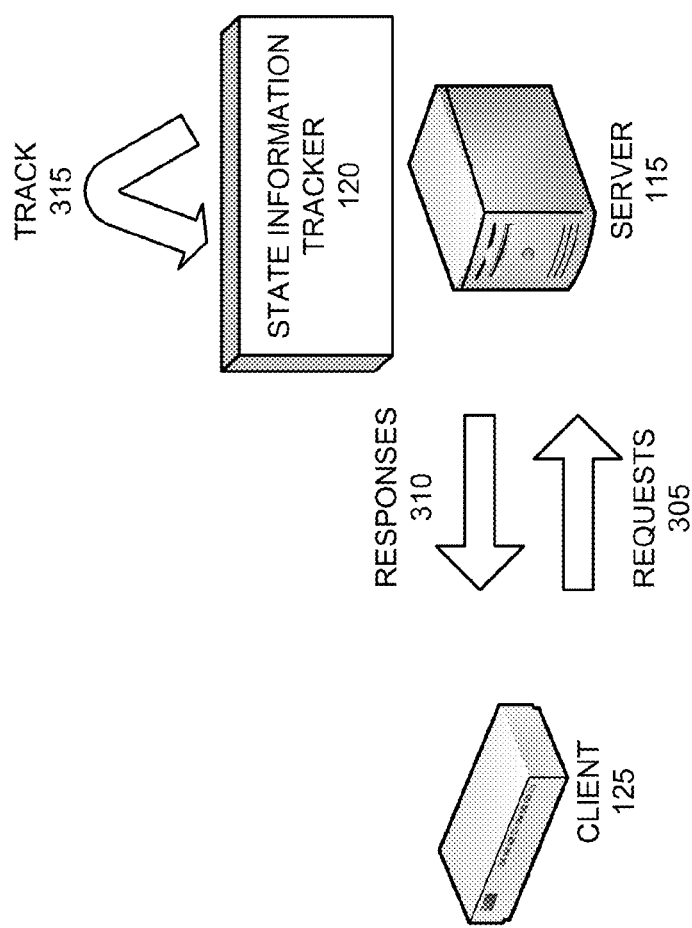
FIGS. 3A-3D are diagrams illustrating an exemplary process associated with state information tracker 120 for providing state-based recovery of content.
Figure 3B:
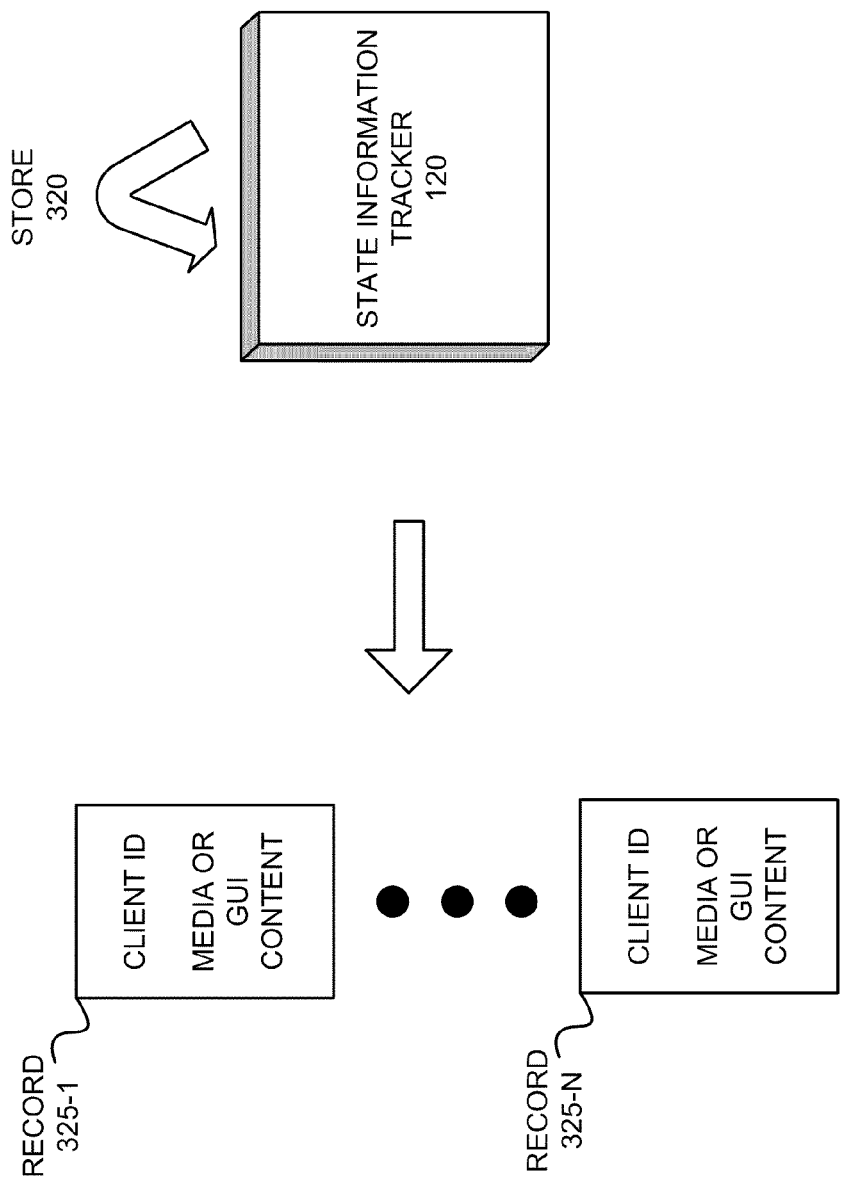

Referring to FIG. 3A, according to an exemplary implementation, client 125 may send requests 305 for content to server 115, and server 115 may send responses 310 to client 125. As further illustrated, as server 115 provides the content to client 125, state information tracker 315 may track 315 state information associated with the content. For example, as illustrated in FIG. 3B, state information tracker 120 may store 320 records 325-1 through 325-N (referred to generally as records 325 or record 325) for each client 125. Records 325 may be stored as a variety of data structures (e.g., list, a map, an array, etc.). Record 325 may include ID information (e.g., a client 125 ID) and media or GUI content information. The ID information may uniquely identify client 125 (e.g., an equipment ID, a network address, etc.). Media or GUI content information may include GUI information (e.g., a GUI screen, a GUI identifier associated with the GUI screen, GUI state information (e.g., selections/navigations made by the user leading up to the last GUI screen), etc.) or media content information (e.g., a media content identifier, such as a television channel, a progress point with respect to video-on-demand media content, etc.)). State information tracker 120 may store 320 records 325 until an error occurs between client 125 and server 115. For example, an error may include a connection error (e.g., a communication error) between client 125 and server 115 or a device error (e.g., client 125 crashes or server 115 crashes).

Figure 3C:
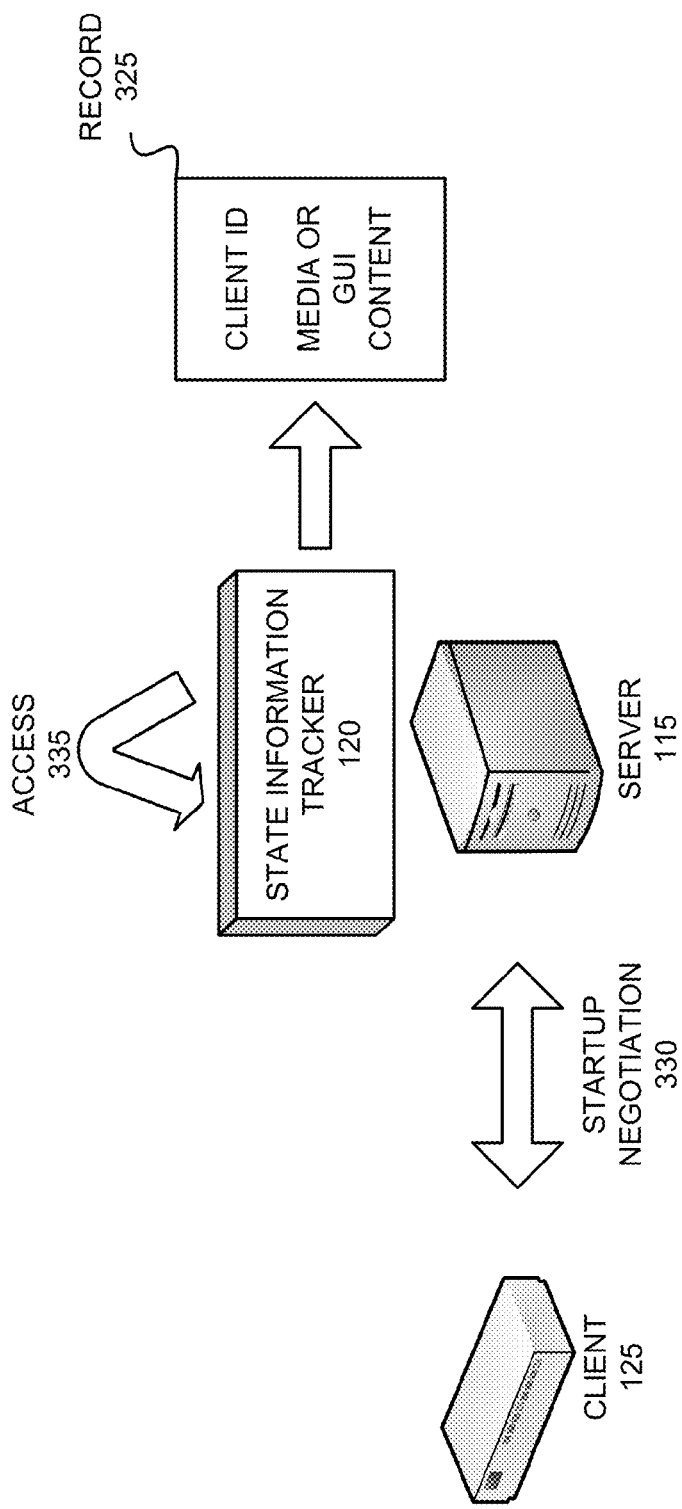
Figure 3D:
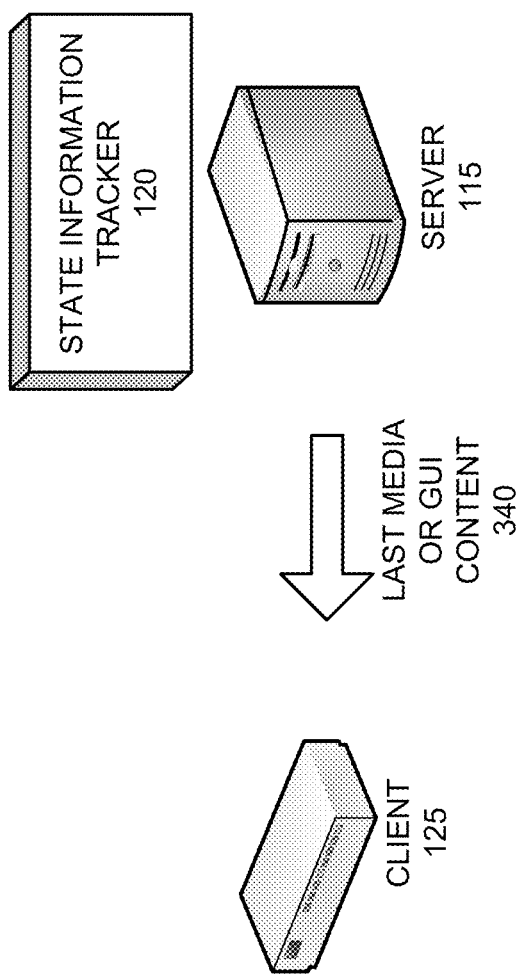

Referring to FIG. 3C, when an error occurs, according to an exemplary implementation, client 125 and server 125 may participate in a startup negotiation 330. Startup negotiation 330 may include re-establishing a connection between client 125 and server 115. When a connection is re-established, state information tracker 120 may access 335 record 325 corresponding to client 125. Server 115 may provide a last media or GUI content 340 to client 125 based on record 325, as illustrated in FIG. 3D.

Figure 4:
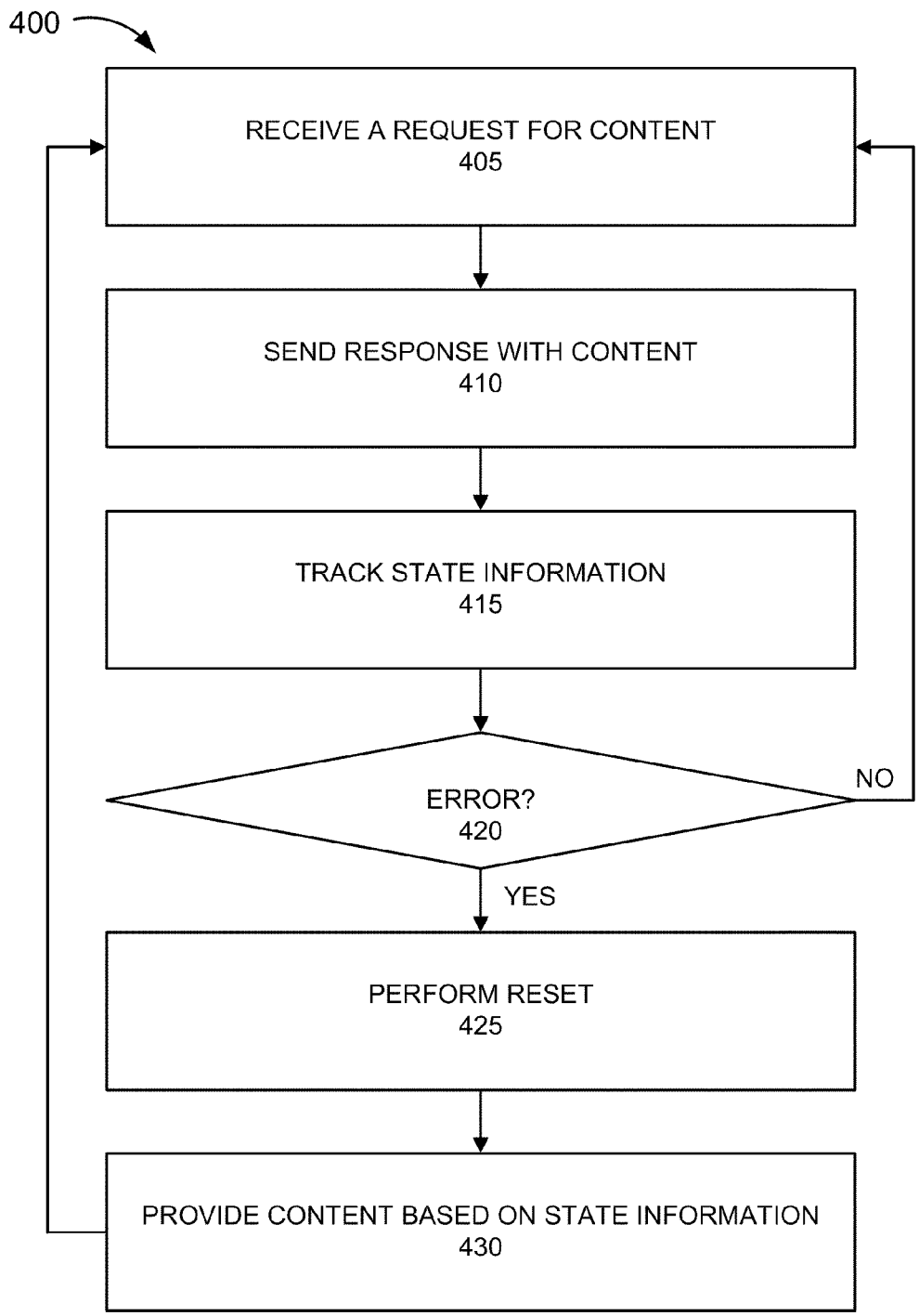
FIG. 4 is a flow diagram illustrating an exemplary process for providing state-based recovery of content.

FIG. 4 is a flow diagram illustrating an exemplary process 400 for providing a state-based recovery of content. According to an exemplary implementation, process 400 may be performed by server 115 (e.g., state information tracker 120). For example, according to an exemplary embodiment, server 115 and client 125 may be implemented as customer premise equipment for delivering television content to a user. For example, server 115 and client 125 may be implemented in a home network. According to other implementations, state information tracker 120 may be implemented within a device other than a server and/or a combination of devices, within other topologies, relate to other types of content, etc.

Process 400 may include receiving a request for content (block 405). For example, as previously described, server 115 may receive a request for content from client 125. The content may correspond to television content. The television content may correspond to, for example, GUI content (e.g., a television guide, weather information, sports information, a game, digital video recording (DVR) information, or the like) or media content (e.g., television programming, video-on-demand, pay-per-view, or the like).

A response that includes the requested content may be sent (block 410). For example, as previously described, server 115 may provide the requested content to client 125. According to an exemplary implementation, server 115 may store the content and provide the content to client 125. According to other exemplary implementations, server 115 may obtain the content from TCDN 105 and then provide the content to client 125. According to an exemplary implementation, server 115 may receive a confirmation that the content was successfully received by client 125.

State information associated with the content and/or the request may be tracked (block 415). For example, as previously described, server 115 may store state information associated with the content provided. For example, server 115 may store a record that includes a client ID and GUI or media content information.

It may be determined whether an error occurred (block 420). For example, server 115 may recognize when an error (e.g., a connection error, a client error, etc.) occurs. Conversely, client 125 may recognize when an error (e.g., a connection error, a server error, etc.) occurs. When an error occurs, a reset process may be initiated (e.g., either by client 125 or server 115). The reset process may correspond to a soft reset or a hard reset.

When it is determined that an error did not occur (block 420—NO), server 115 may continue receiving requests from client 125 (return to block 405). When it is determined that an error occurred (block 420—YES), a reset process may be initiated (block 425). For example, server 115 or client 125 may initiate a reset process. The reset process may include re-establishing a connection (e.g., a communication link) between server 115 and client 125.

Content may be provided to the client based on state information (block 430). For example, as previously described, server 115 may select the last GUI or media content information provided to client 125 before the error occurred based on the state information. For example, server 115 may access a record 325 associated with client 125. Record 325 may include client ID information and GUI or media content information. Server 115 may provide the last GUI or media content information to client 125. Process 400 may continue to block 405.

Although FIG. 4 illustrates an exemplary process 400 according to other implementations, process 400 may include additional operations, fewer operations, and/or different operations than those illustrated in FIG. 4 and described herein.

According to another exemplary embodiment, multiple servers may share state information associated with content provided to clients. When an error occurs between a server and a client, the client has the option to discover and connect to an alternate server. The alternate server may provide the client with the last content before the error occurred. According to an exemplary implementation, when the client connects to a server, the server may generate and send the client a token. As the server provides content to the client, the server may store state information. The server may also provide other servers with the token and the state information. When an error occurs, the client may connect to an alternate server and provide the alternate server with the token. The alternate server may use the token to identify the state information associated with the client. That is, for example, the token may act as an index or key to the state information. The alternate server may then provide the last content to the client.

Figure 5A:
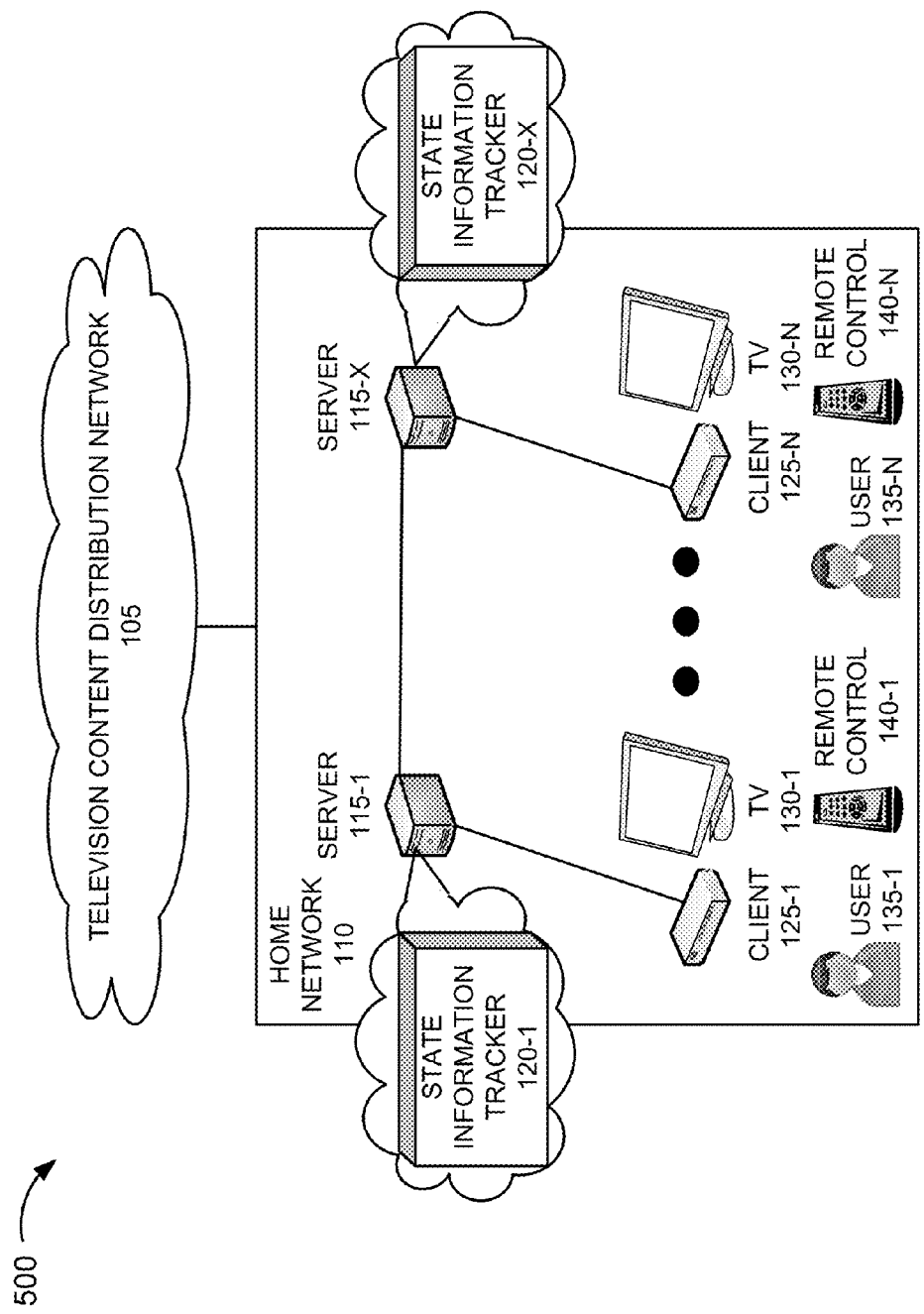
FIG. 5A is a diagram illustrating an exemplary environment in which an exemplary embodiment for providing state-based recovery of content may be implemented.

FIG. 5A is a diagram illustrating an exemplary environment 500 in which another exemplary embodiment for providing state-based recovery of content may be implemented. As illustrated in FIG. 5A, environment 500 may include devices previously described with respect to FIGS. 1A-1E. However, environment 500 may include servers 115-1 through 115-X (where X>1) that include state information trackers 120-1 through 120-X (where X>1).

Figure 5B:
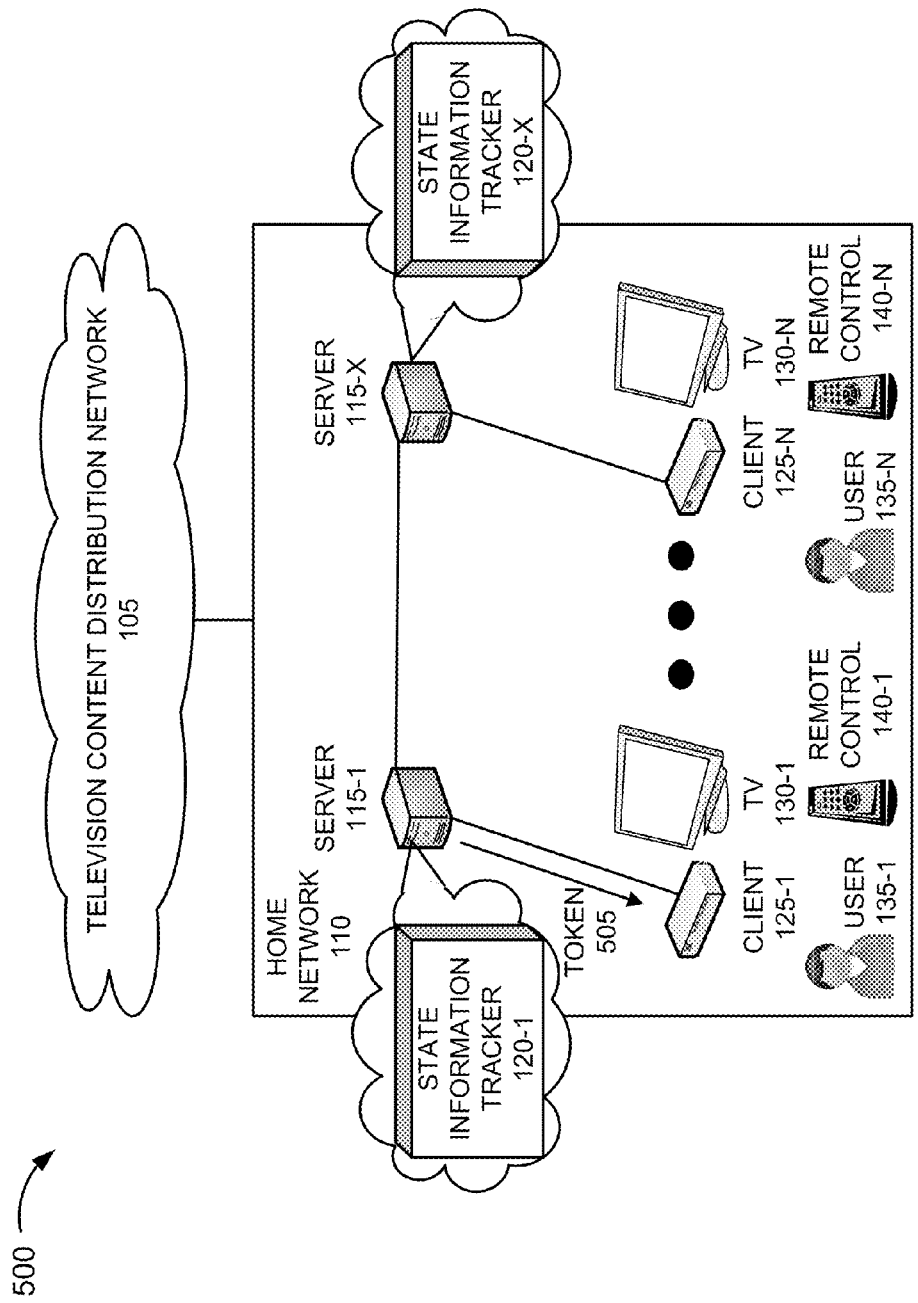
FIGS. 5B-5G are diagrams illustrating an exemplary process for providing state-based recovery of content according to an exemplary embodiment.
Figure 5C:
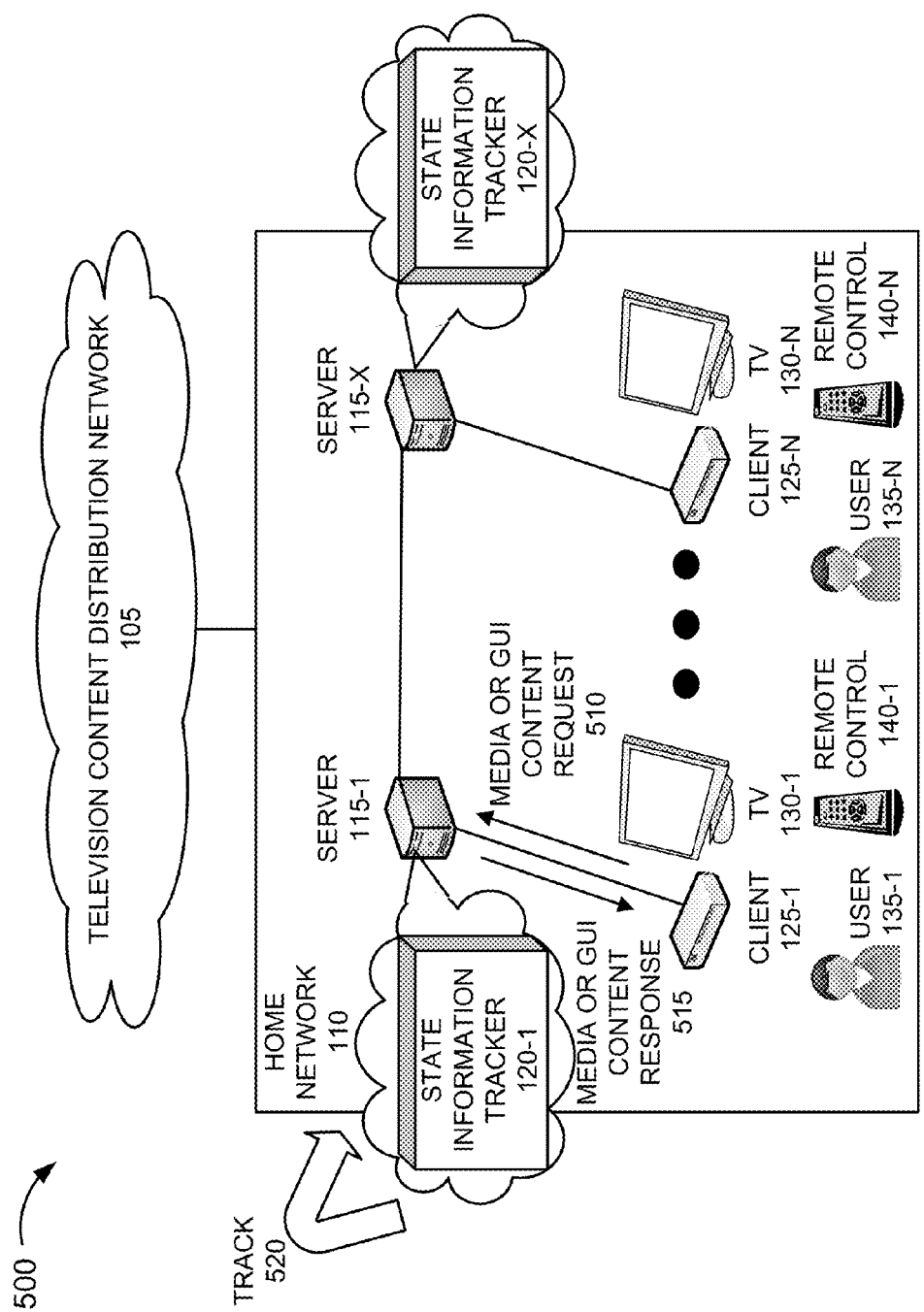

Referring to FIG. 5B, according to an exemplary process, client 125-1 and server 115-1 may establish a connection. Server 115-1 may generate a token 505 and send token 505 to client 125-1. Token 505 may include a unique value. Client 125-1 may store token 505. Referring to FIG. 5C, user 135-1 may select a GUI or media content using remote control 140-1 and client 125-1. Client 125-1 may send a media or GUI content 510 request to server 115-1. Server 115-1 may send a media or GUI content response 515 to client 125-1. Additionally, state information tracker 120 may track 520 state information associated with the media or GUI content provided to client 125-1.

Figure 5D:
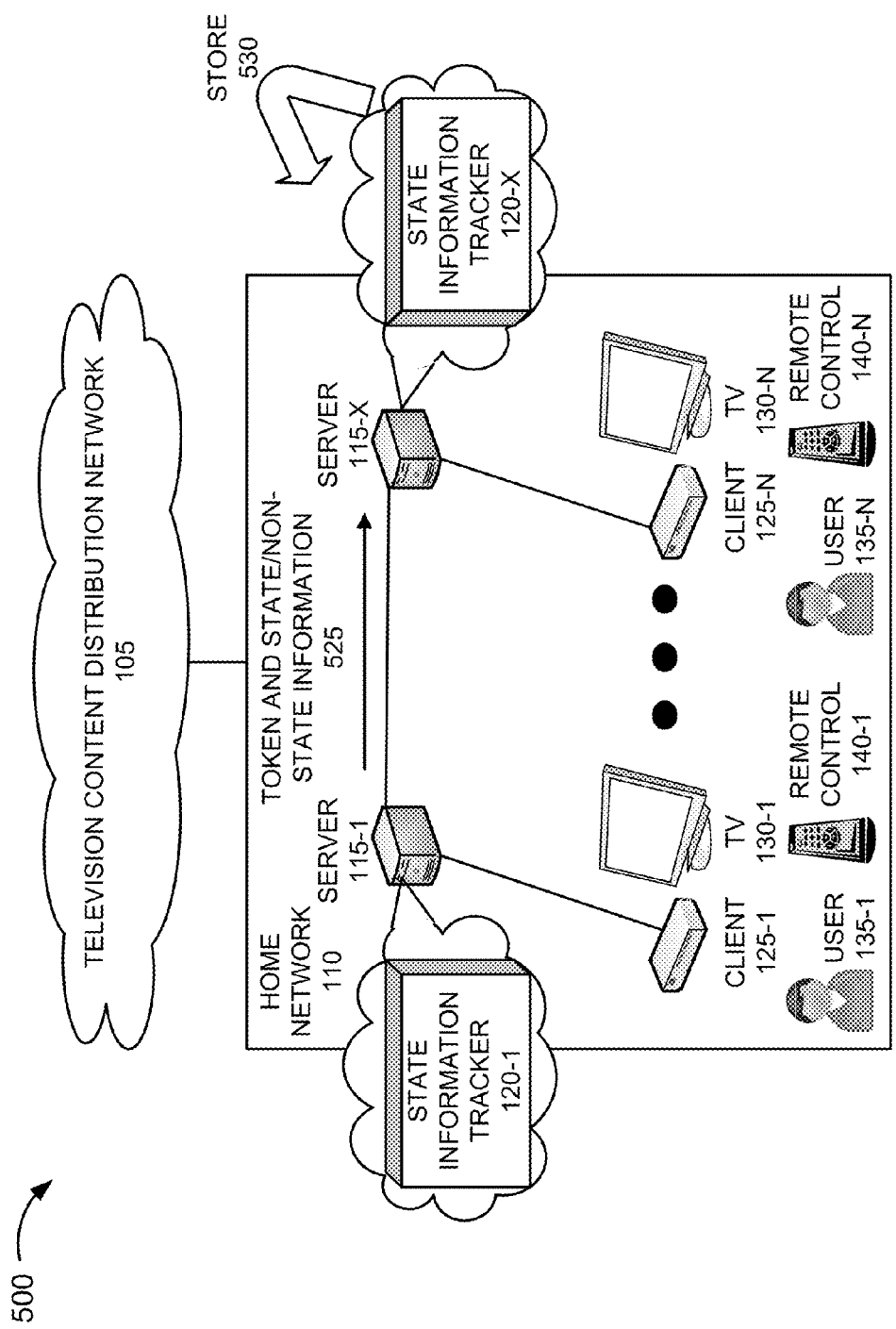
Figure 5E:
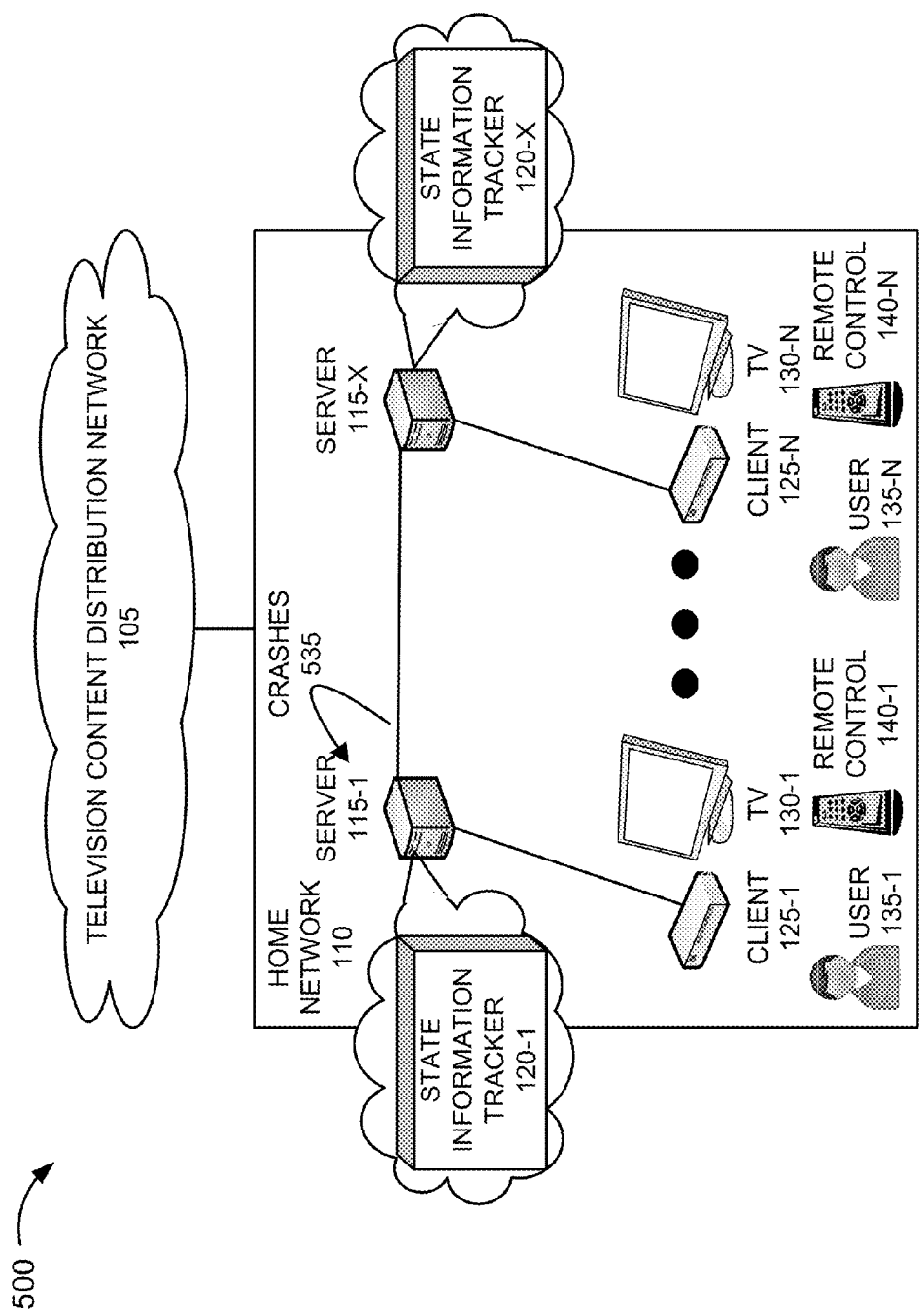

Referring to FIG. 5D, server 115-1 may send token 505 and state information 525 to other servers 115. Sever 115-1 may also send non-state information (e.g., user preferences, etc.). Other servers 115 may store 530 the token and state/non-state information. Subsequently, as illustrated in FIG. 5E, an error occurs. For example, server 115-1 crashes 535. User 135-1 may unplug client 125-1 and client 125-1 may reset.

Figure 5F:
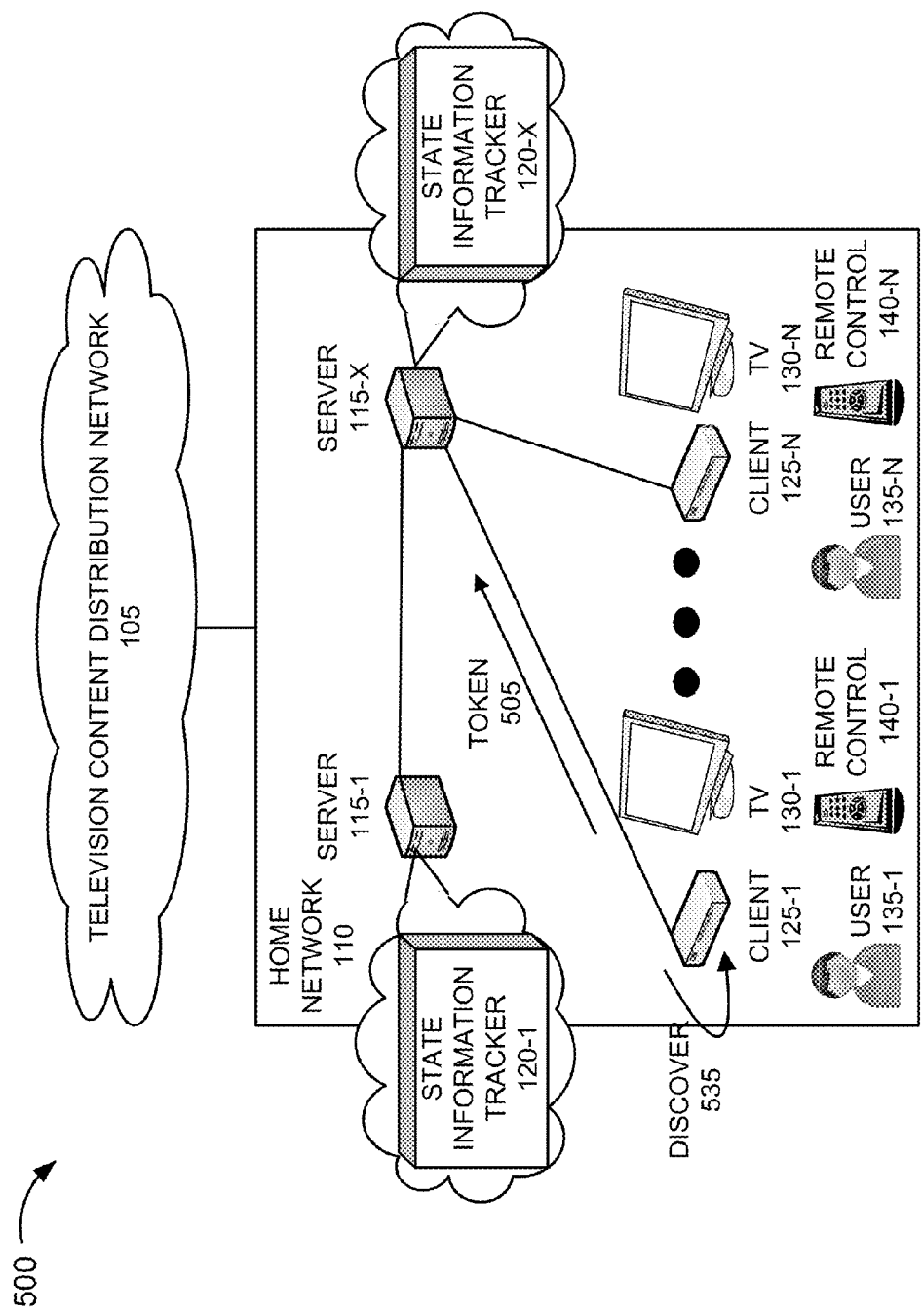
Figure 5G:
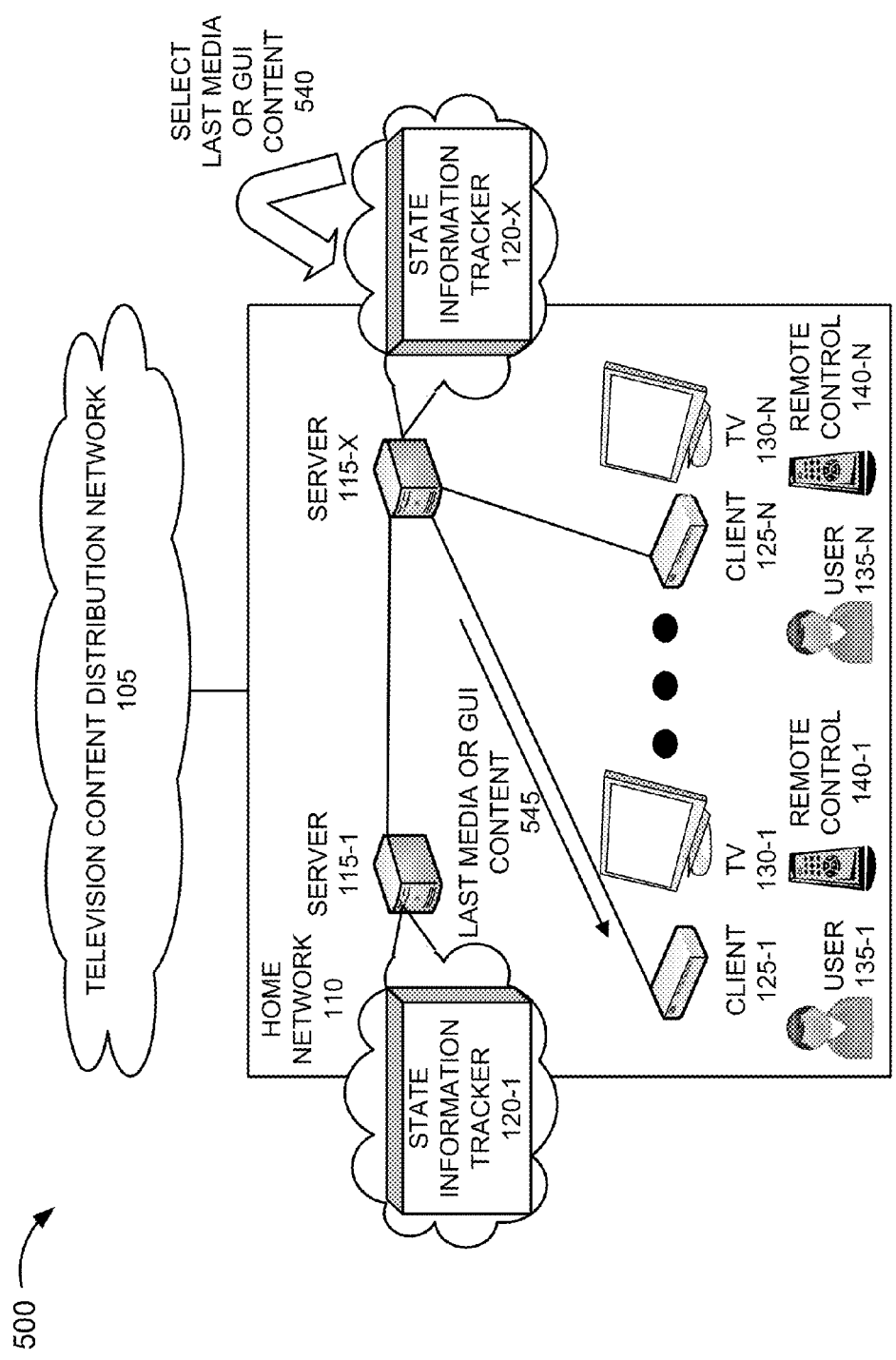

Referring to FIG. 5F, client 125-1 may discover 535 another server 115-X and establish a connection with server 115-X. Additionally, client 125-1 may send token 505 to server 115-X. As illustrated in FIG. 5G, server 115-X may select the last media or GUI content 540 based on token 505. Server 115-X may provide the last media or GUI content 545 to client 125-1.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified in other implementations. Further, non-dependent blocks may be performed in parallel. Additionally, other processes described in this description may be modified and/or non-dependent operations may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware (e.g., processing system 205, etc.), a combination of hardware and software (e.g., applications 215), a combination of hardware and firmware, or a combination of hardware, firmware, and software, or software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive. For example, according to other embodiments, assume that the server receives a request for television content and an error occurs before a response is sent to the client. In such instances, the server may store the request as state information. When a new communication link is established, instead of the server resending the last television content successfully received by the client, the server may send the new television content associated with the request received by the server before the error occurred.

No element, act, or instruction used in the present application should be construed as critical or essential to the implementations described herein unless explicitly described as such.

What is claimed is:

1. A method comprising:
receiving, by a first device, a request from a second device to provide a television content, wherein the television content includes a user interface or a scheduled television program associated with a channel selected;
sending, by the first device and to the second device, a response that includes the television content;
tracking, by the first device, state information associated with the television content, wherein the state information includes an identifier of the second device and an identifier of the television content provided;
detecting when an error occurs between the first device and the second device;
performing a reset process that includes causing the first device or the second device to reboot;
re-establishing a new connection between the first device and the second device;
selecting based on the state information, by the first device, a last television content that was successfully received and displayed via the second device before the error occurred in response to the re-establishing; and
sending, via the new connection, by the first device and to the second device, the last television content in response to the selecting, wherein the last television content includes the user interface displayed via the second device before the error occurred or a television program that is currently available on the channel selected before the error occurred.

2. The method of claim 1, wherein the first device includes a server and the second device includes a client of a home network, and the method further comprising:
displaying or causing to display, via the second device, the television content received in response to the request.

3. The method of claim 1, further comprising:
obtaining, by the first device, the television content from a television content distribution network, and wherein the reboot is a hard reboot or a soft reboot.

4. The method of claim 1,
wherein the error includes that the second device crashes and the state information includes a user interface identifier that identifies the user interface.

5. The method of claim 1, wherein the second device includes a set top box, the method further comprising:
generating, by the first device, a token; and
sending, by the first device and to the second device, the token with the television content, wherein the token includes a key that identifies the state information.

6. The method of claim 1, wherein the state information includes a channel identifier.

7. The method of claim 1, wherein the error includes at least one of a device error or a communication error.

8. The method of claim 1, wherein the user interface pertains to one of a television guide, weather information, digital video recording information, or a game, and the state information includes navigations made by a user leading up to a last user interface.

9. A device comprising:
a communication interface;
a memory to store instructions; and
a processing system to execute the instructions to:
receive, via the communication interface, a request from another device to provide a television content, wherein the television content includes a user interface or a scheduled television program associated with a channel selected;
send, via the communication interface, a response to the other device that includes the television content;
store state information associated with the television content, wherein the state information includes an identifier of the other device and an identifier of the television content provided;
detect when an error occurs between the device and the other device;
perform a reset process;
re-establish a new connection between the device and the other device;
select based on the state information, by the device, a last television content that was successfully received and displayed via the other device before the error occurred in response to a re-establishment of the new connection; and
send, via the communication interface and to the other device, the last television content in response to a selection of the state information, wherein the last television content includes the user interface displayed via the other device before the error occurred or a television program that is currently available on the channel selected.

10. The device of claim 9, wherein the device includes a server of an in-home network, and wherein when performing the reset process, the processing system to execute the instructions to:
perform the reset process that includes a reboot.

11. The device of claim 9, wherein the processing system to execute the instructions to:
generate a token; and
send, via the communication interface and to the other device, the token with the television content, wherein the token includes a key that identifies the state information.

12. The device of claim 11, wherein the processing system to execute the instructions to:
receive, via the communication interface and from the other device via the new connection, the token; and
select the state information based on the token.

13. The device of claim 9, wherein the processing system executes the instructions to:
obtain the identifier of the other device; and
receive, via the communication interface, the scheduled television program from a television distribution network.

14. The device of claim 9, wherein the state information includes a television channel identifier.

15. The device of claim 9, wherein the error includes a device error.

16. The device of claim 9, wherein the user interface pertains to one of a television guide, weather information, digital video recording information, or a game, and the state information includes navigations made, by a user via the other device, leading up to a last user interface.

17. A non-transitory storage medium storing instructions executable by at least one processing system of a device, the non-transitory storage medium storing instructions to:
receive a request to provide television content, wherein the television content includes a user interface pertaining to a television service or a television program associated with a television channel;
send a response that includes the television content;
store state information associated with the television content, wherein the state information includes an identifier of the television content provided;
detect when a device error or a communication error occurs;
re-establish a new connection based on a detection of the error;
select based on the state information, a last television content that was successfully sent before the device error or the communication error occurred in response to a re-establishment of the new connection; and
send the last television content, wherein the last television content includes the user interface or the television program that is currently available on the television channel.

18. The non-transitory storage medium of claim 17, further storing one or more instructions to:
perform a reset process that includes a reboot.

19. The non-transitory storage medium of claim 17, further storing one or more instructions to:
generate a token; and
send the token with the television content, wherein the token includes a key that identifies the state information.

20. The non-transitory storage medium of claim 17, wherein the identifier of the television content includes a television channel identifier.

21. A method comprising:
receiving, by a first device, a request from a second device to provide television content, wherein the television content includes a user interface or a scheduled television program associated with a channel selected;
sending, by the first device and to the second device, a response that includes the television content and a token that identifies state information associated with the television content;
tracking, by the first device, state information associated with the television content, wherein the state information includes an identifier of the television content provided;
sending, by the first device to a third device, the token and the state information;
detecting when an error occurs between the first device and the second device;
receiving, by the third device and from the second device, the token; and
sending, by the third device, a last television content that was successfully received by the second device before the error occurred based on the token, wherein the last television content includes the user interface or a television program that is currently available on the channel selected before the error occurred.

22. The method of claim 21, wherein the first device and the third device each correspond to a server and the second device corresponds to a client.

23. The method of claim 21, further comprising:
using the token received from the second device to select the state information associated with the second device.

24. The method of claim 21, further comprising:
sending, by the first device to the third device, non-state information; and
storing, by the third device, the token, the state information, and the non-state information, wherein the non-state information include user preferences pertaining to a user of the second device.

\* \* \* \* \*